3,579,606
N-DECATRIENE ISOMERIZATION
Wilfried Umbach, Langenfeld, Germany, assignor to Henkel & Cie, GmbH, Dusseldorf-Holthausen, Germany
No Drawing. Filed Apr. 10, 1969, Ser. No. 815,185
Claims priority, application Germany, June 29, 1968, P 17 68 792.2
Int. Cl. C07c 11/00
U.S. Cl. 260—677   3 Claims

ABSTRACT OF THE DISCLOSURE

As a new compound, n-decatriene-1,6,8, useful as a modifier for coating agents, particularly for reducing the dust drying time of air-drying alkyd resin coating agents.

OBJECTS OF THE INVENTION

It is an object of the invention to provide the novel compound, n-decatriene-1,6,8.

It is another object of the invention to provide a novel process for the preparation of n-decatriene-1,6,8.

It is a further object of the invention to provide novel alkyd resin coating compositions having improved characteristics.

These and other objects and advantages of the invention will become obvious from the following detailed description.

THE INVENTION

The novel product of the invention is n-decatriene-1,6,8 of the formula

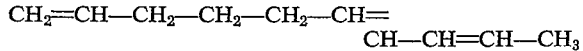

n-Decatrienes having isolated, cumulated or triple conjugated double bonds are known but an n-decatriene with a conjugated diene system as in the compound of the invention are not known.

The n-decatriene-1,6,8 of the invention due to its conjugated diene system is a valuable starting material for many syntheses involving addition reactions with unsaturated compounds. The said compound is also a valuable modifier for paints and varnishes, particularly air-drying alkyd resin compositions.

Compared to alkyd resin paints using conventional diluents, alkyd resin paints modified with n-decatriene-1,6,8, preferably 40 to 100% by weight based on the alkyd resin, have a reduced dust-drying time and a higher coefficient of evaporation of the solvent without imparing the hardness properties of the paint film. The paint compositions of the invention have the further advantage of faster drying and improved brush application as well as a lower intrinsic color.

The novel process of the invention for the preparation of n - decatriene - 1,6,8 comprises isomerizing an n-decatriene with isolated double bonds at an elevated temperature in the presence of a catalytic amount of a base. The isomerization is preferably effected in the absence of moisture and air.

Suitable basic catalysts are alkali metal alcoholates of lower aliphatic alcohols such as sodium methylate potassium ethylate, lithium n-butylate, potassium sec.-butylate, potassium tert.-butylate, etc. The amount of catalyst used may be 0.1 to 5%, preferably 0.5 to 2%, by weight based on the n-decatriene starting material.

The isomerization is preferably effected at a temperature of 100–200° C. and most preferably at the boiling point of n-decatriene starting material. A solvent is not generally required for the reaction but a polar organic solvent such as dimethyl sulfoxide may be used.

The starting n-decatriene is preferably admixed with the catalyst and refluxed at the reaction temperature from 1 to 5 hours and the reaction mixture may be poured into water and neutralized with a dilute acid. The organic phase is recovered and dried over a desiccant such as sodium sulfate and then fractionated.

The starting n-decatriene may be n-decatriene-1,5,9 produced by reacting 1,4-dibromobutene-2 with allyl magnesium bromide or n-decatriene-1,4,9 prepared by reacting ethylene and butadiene in the presence of a mixed Ziegler catalyst. The starting material may also be mixtures of different isomers of n-decatrienes with isolated double bands.

In the following examples there are described several preferred embodiments to illustrate the invention. However, it should be understood that the invention is not intended to be limited to the specific embodiments.

EXAMPLE I 0.55 g. of potassium (corresponding to 1% by weight potassium methylate, related to the n-decatriene used) were dissolved in 10 g. of absolute methanol in the absence of air and moisture. Excess methanol was distilled off so that a clear solution of potassium methylate was still present in the methanol. After cooling to about 40° C., 100 g. of n-decatriene-1,4,9 (B.P. 36° C. at 8 mm. Hg, $n_D^{20}=1.4478$, 99% purity measured by gas chromatography) were added thereto and the reaction mixture was heated slowly on the descending condenser to 135° C. with the last portions of methanol being distilled off. The descending condenser was subsequently replaced by a reflux condenser and the temperature increased to 160° C. and the reaction mixture was kept at this temperature for 3 hours. Subsequently the reaction product was taken up in water and neutralized with dilute hydrochloric acid. The organic phase was separated and dried over sodium sulfate to obtain 98.5 g. of a crude product having a refractive index of $n_D^{20}=1.4747$, which according to gas-chromatographic analysis consisted of 80% of n-decatriene-1,6,8, 12% of 1,2-divinyl cyclohexane, 5% of n-decatriene-1,4,9 and 3% of unidentified substances. The crude product was fractionated on an 80 cm. Stedmann-column, and n-decatriene-1,6,8 was obtained as the main fraction at 68° C. at 13 mm. Hg and was a colorless liquid with an index of refraction $n_D^{20}=1.4768$. The 99% degree of purity was determined by gas chromatography on an Apiezon-M-column. The hydrogenation iodine number of 566 found was in good agreement with the calculated value 561. The assumed structure was verified by IR-, UV- and NMR spectrographic tests.

Conjugated diene content by UV _____ 97%.
Conjugated triene content by UV _____ 0%.
1,3-conjugated diene content by IR ____ Not detectable.
2,4-conjugated diene content by IR ____ About 97%.
Alpha-olefin content (calculated as n-decatriene-1, x, y, where x and y are not conjugated to to 1) _____ 100%.

NMR spectrum (Varian A 60: 10% by weight n-decatriene-1,6,8 in CCl₄)

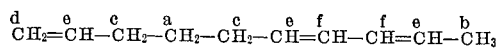

Chemical displacement in δ (toward trimethyl silane as internal standard)

a: 1.6 p.p.m.
b: 1.7 p.p.m.
c: 2.1 p.p.m.
d: 5.0 p.p.m.
e: 5.7 p.p.m.
f: 6.1 p.p.m.

EXAMPLE II

In a test similar to Example I, 75 g. of n-decatriene-1,4,9 were isomerized in the presence of 1% by weight of sodium methylate and in the presence of 7.5 g. dimethyl sulfoxide. 74.1 g. crude product with a refractive index of $n_D^{20}=1.4780$ were obtained which consisted of, according to gas-chromatographic analysis, 80% of n-decatriene-1,6,8, 11% of 1,2-divinyl cyclohexane, 2% of n-decatriene-1,4,9 and 7% of unidentified substances. By fractional distillation as in Example I, pure n-decatriene-1,6,8 ($n_D^{20}=1.4768$) was obtained.

EXAMPLE III 44 parts by weight of n-decatriene-1,6,8 and 50 parts by weight of Lioptal 664 (oil-modified alkyd resin based on linseed oil, oil content about 65%, phthalic anhydride content 26%, acid number 5–10, viscosity of 50% solution in mineral spirits at 20° C. 600–1000 cp.), 3 parts by weight Deikalin and 3 parts by weight other customary varnish additives (siccative, antiskinning agent) were admixed to a brushable varnish.

For determination of the scratch resistance, a device (drying recorder) developed by Beck, Koller and Co. Ltd., Liverpool, was used. The principle of this method was based on the fact that pins were drawn over the varnish brushed on glass plates at a defined speed and the time was measured at which the pins leave no further impressions on the film. The determination of the dust-drying time was made in a similar manner except that paper strips were placed between the pins and the varnish film and the time was determined at which the paper no longer adhered to the varnish film.

The evaporation coefficient of the varnish solvent was determined according to DIN 53,170, where the evaporation coefficient of diethyl ether equals 1 as a standard.

For comparison, we made similar tests with varnishes which contained instead of n-decatriene-1,6,8 the same amount of xylene or mineral spirits (B.P. 150–190° C.). The results obtained are compiled in the following table.

|  | Varnish additive | | |
| --- | --- | --- | --- |
|  | Xylene | Mineral spirits | n-Decatriene-1,6,8 |
| Dust drying time | 6 | 9 | 5 hours. |
| Evaporation coefficient | 13 | ca. 75 | About 60. |
| Scratch resistance | >11 | >11 | 10 hours. |

The varnishes modified with n-decatriene-1,6,8, thus show improved drying properties. The high evaporation coefficient of the solvent enhances at the same time the brushing properties of the varnish modified with the additive of the invention.

Various modifications of the method and compositions of the invention may be made without departing from the scope or spirit thereof.

I claim:

1. A process for the preparation of n-decatriene-1,6,8 which comprises isomerizing at least one n-decatriene having isolated double bonds in the presence of 0.1 to 5% by weight, based on the starting n-decatriene, of an alkali metal alcoholate at a temperature of 100 to 200° C.

2. The process of claim 1 wherein the amount of catalyst is 0.5 to 2% by weight.

3. The process of claim 1 wherein the isomerization of the n-decatriene is effected at the reflux temperature of the said n-decatriene.

References Cited

UNITED STATES PATENTS

| 3,392,209 | 7/1968 | Schneider et al. | 260—677 |
| 3,441,629 | 4/1969 | Zuech | 260—683.2 |
| 3,449,463 | 6/1969 | Kenton et al. | 260—677 |

PAUL M. COUGHLAN, JR., Primary Examiner

V. O'KEEFE, Assistant Examiner

U.S. Cl. X.R.

260—22